Nov. 14, 1933.     E. EUGSTER     1,935,550
ELECTRIC LOCOMOTIVE TRUCK
Filed June 3, 1932

Inventor
E. Eugster
by
Attorney

Patented Nov. 14, 1933

1,935,550

UNITED STATES PATENT OFFICE 1,935,550

ELECTRIC LOCOMOTIVE TRUCK

Emil Eugster, Ennetbaden, Switzerland, assignor to Aktiengesellschaft Brown Boveri & Cie., Baden, Switzerland, a joint-stock company of Switzerland Application June 8, 1932, Serial No. 615,958, and in Germany June 8, 1931

6 Claims. (Cl. 105—184)

This invention relates to improvements in trucks for electrically driven locomotives and more particularly to locomotives in which the several pairs of traction wheels are individually driven and in which the trucks are provided with wheels for guiding the traction wheels when traversing a curve in the track.

In locomotive trucks of the character above indicated, it is desirable to permit removal and replacement of the traction wheels, the driving motor and the gear or other transmission between the gear and the motor with a minimum disturbance of the truck structure. It is also frequently necessary to partially disassemble the several portions of a truck to permit inspection or minor repairs thereof. Such partial disassembly of a truck is most readily accomplished if the connections of the guide wheels with the traction wheels are so constructed as to permit removal of the traction wheels, the driving motors and the transmission mechanism therebetween from below.

It is, therefore, among the objects of the present invention to provide a locomotive truck having the pairs of traction wheels driven individually and connected with guide wheels in which the truck is so constructed as to permit removal and replacement of the traction wheels, the driving motors and the transmission mechanism therebetween with the minimum disturbance of the truck structure generally.

Another object of the invention is to provide a locomotive truck having the pairs of traction wheels driven individually and connected with guide wheels in which the truck is so constructed as to permit removal and replacement of the traction wheels, the driving motors and the transmission mechanism therebetween from below without disturbance of other portions of the truck structure.

Another object is to provide a locomotive truck having traction wheels which are resiliently mounted in the truck frame and the pairs of wheels are individually driven, the traction wheels being so connected with guide wheels as to permit removal of the former without disturbance of the latter or of the driving means.

Figure 1:
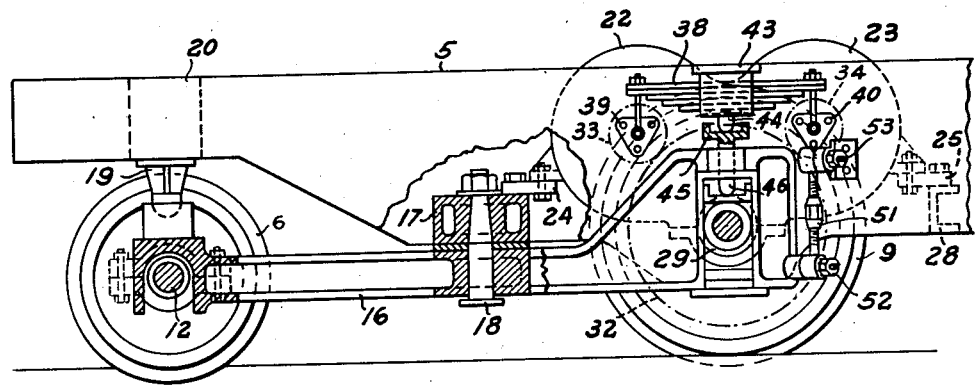
Figure 2:
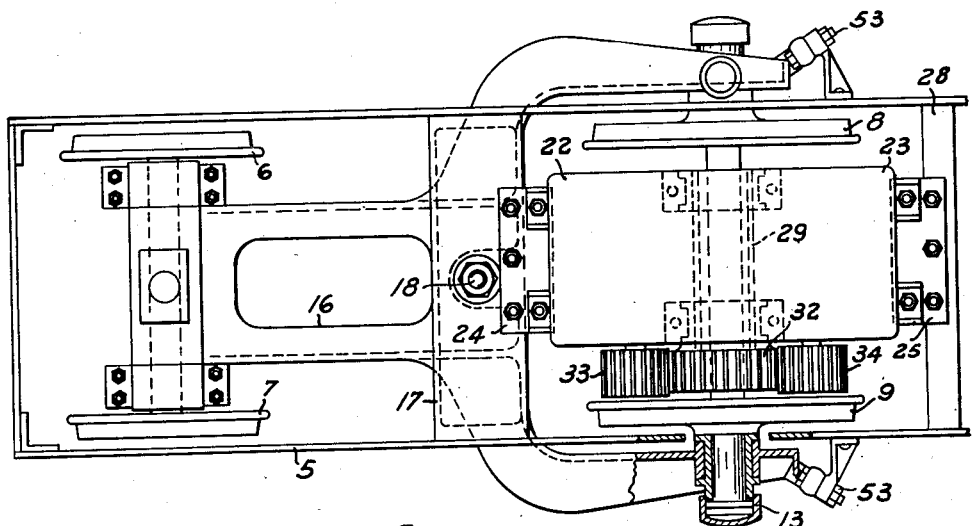

Objects and advantages, other than those above set forth, will be apparent from the following description when read in connection with the accompanying drawing in which:

Fig. 1 is a side elevation, partially in section, of a portion of a truck for a locomotive having the pairs of traction wheels individually driven by electric motors through a suitable transmission mechanism and having the traction wheels guided by wheels connected therewith; and Fig. 2 is a top view of Fig. 1, portions thereof also being shown in section.

Referring more particularly to the drawing by characters of reference, the numeral 5 designates a portion of a frame of a truck for a locomotive. The truck frame is carried by one or more sets of wheels 6, 7 not provided with driving means and by one or more sets of traction wheels 8, 9, each provided with driving means. The wheels 6, 7 are mounted on an axle 12 which is connected with an axle 13, at the outer ends of the latter, on which the traction wheels 8, 9 are mounted by means of a connecting member 16 pivotally connected with a cross brace member 17 of the truck frame 5 by a bolt 18. The wheels 6, 7 support a portion of the weight of the truck frame, and the weight of other portions of the locomotive mounted thereon, by way of bolster 19 connected with a cross brace member 20 and slidably resting on top of the connecting member 16 over the axle 12.

The pairs of traction wheels 8, 9 are driven individually by electric motors 22, 23 removably mounted on removable plates 24, 25 secured to the cross brace member 17 and to a cross brace member 28 of the truck frame 5 respectively on the one hand and are removably mounted on a sleeve 29 on the axle 13 on the other hand. The sleeve 29 serves as a support and bearing for a gear 32 engaging with the driving pinions 33 and 34 of the motors 22 and 23 respectively. The gear 32 is connected with a traction wheel 9 preferably by means of a connection such as described in U. S. Letters Patent No. 1,738,635, issued to Jacob Buchli and assigned to A. B. Brown Boveri and Company of Baden, Switzerland, and, therefore, not illustrated herein.

The traction wheels are movably mounted in the truck frame 5 by means of springs, herein illustrated as leaf springs 38 having the ends thereof secured to the truck frame as at 39 and 40. A flanged plate 43 placed substantially on the center of the spring retains the several leaves thereof in properly associated relation. The spring action is transmitted to the traction wheels through a boss 44 on the bottom leaf resting on a plate 45 having a portion 46 extending downwardly into the structure of the connecting member 16 about the axle 13, thus permitting only very slight lateral movement between the frame and the wheels but permitting considerable vertical movement therebetween. Road shocks transmitted through the traction wheels to the frame are thus damped and reduced by the action of the springs 38.

The forked ends of the connecting member 16 are each connected with the truck frame 5 by means of adjustable rods 51 having ball ends cooperating with sockets 52 and 53 mounted on the forked ends of the connecting member and on the frame respectively. It will be understood that the rods 51 may also be formed with or replaced by suitable spring arrangements by which a resilient as well as a universal joint connection may be obtained between the forked ends of the connecting member and the frame. In any event the non-resilient masses of the truck are reduced to a minimum. The rods 51 are preferably so arranged that the planes passing through the longitudinal central axes thereof intersect on the longitudinal axis of the pivot 18.

A locomotive truck constructed according to the present invention secures positive guiding of the traction wheels by the guide wheels and torsional forces are not transmitted from the guiding axle to the traction wheels or to the frame. The traction wheels are resiliently connected with the truck frame which minimizes the transmission of road shocks therebetween and reduces the non-resiliently supported masses of the truck. The entire construction is particularly designed to permit ready disassembly of the traction wheels, the driving motors and the gear and other transmission therebetween for inspection, repair or replacement with the minimum disturbance of the other portions of the truck structure.

It is claimed and desired to secure by Letters Patent:

1. In a locomotive truck, a frame, guiding wheels connected by an axle, a portion of said frame being movably supported on the axle of said guiding wheels, traction wheels connected by an axle and resiliently supporting a portion of said frame, means mounted in said frame for driving said traction wheels, a connecting member joining the central portion of the axle of said guiding wheels with the ends of the axle of said traction wheels, and adjustable means universally connecting said frame with one end of said connecting member.

2. In a truck for locomotives, a frame, guiding wheels connected by an axle, a portion of said frame being movably supported on the axle of said guiding wheels, traction wheels connected by an axle and resiliently supporting a portion of said frame, means mounted in said frame for driving said traction wheels, a connecting member pivotally mounted on said frame and joining the central portion of the axle of said guiding wheels with the ends of the axle of said traction wheels, and adjustable rods arranged for universal movement and connecting said frame with one end of said connecting member.

3. In a truck for locomotives, a frame, guiding wheels connected by an axle and movably supporting a portion of said frame, traction wheels connected by an axle and resiliently supporting a portion of said frame, electric motors fixedly mounted in said frame and driving said traction wheels, a connecting member pivotally mounted on said frame and joining the central portion of the axle of said guiding wheels with the ends of the axle of said traction wheels, and adjustable rods arranged for universal movement and connecting said frame with one end of said connecting member.

4. In a truck for locomotives, a frame, guiding wheels connected by an axle and movably supporting a portion of said frame, traction wheels connected by an axle and supporting a portion of said frame, springs fixedly connected with said frame and movably connected with the axle of said traction wheels, electric motors driving said traction wheels, a connecting number joining the central portion of the axle of said guiding wheels with the ends of the axle of said traction wheels, and adjustable rods arranged for universal movement and connecting said frame with one end of said connecting member.

5. In a truck for locomotives, a frame, guiding wheels connected by an axle and movably supporting a portion of said frame, traction wheels connected by an axle and supporting a portion of said frame, springs fixedly connected with said frame and movably connected with the axles of said traction wheels, means partially enclosing said springs to permit only vertical movement thereof, electric motors fixedly mounted in said frame and driving said traction wheels, a connecting member pivotally mounted on said frame and joining the central portion of the axle of said guiding wheels with the ends of the axle of said traction wheels, and adjustable rods arranged for universal movement to connect said frame with one end of said connecting member.

6. In a truck for locomotives, a frame, guiding wheels connected by an axle and movably supporting a portion of said frame, traction wheels connected by an axle and supporting a portion of said frame, springs fixedly connected with said frame and movably connected with the axles of said traction wheels, electric motors fixedly mounted in said frame and driving said traction wheels, a connecting member for the axles of said wheels, said member being pivotally mounted on said frame and having a forked end, one end of said member being connected with the central portion of the axle of said guiding wheels and the forked end of said member being connected with the ends of the axle of said traction wheels, and adjustable rods arranged for universal movement to connect said frame with the forked end of said connecting member.

EMIL EUGSTER.